(12) United States Patent
Cipollini et al.

(10) Patent No.: US 9,118,081 B2
(45) Date of Patent: *Aug. 25, 2015

(54) MEMBRANE ELECTRODE ASSEMBLIES WITH HYDROGEN PEROXIDE DECOMPOSITION CATALYST

(75) Inventors: Ned E. Cipollini, Enfield, CT (US); David A. Condit, Avon, CT (US); Jared B. Hertzberg, College Park, MD (US); Thomas D. Jarvi, Manchester, CT (US); James A. Leistra, Penfield, NY (US); Michael L. Perry, Glastonbury, CT (US); Sathya Motupally, Milford, CT (US)

(73) Assignee: Audi AG, Ingolstadt (DE)

( * ) Notice: Subject to any disclaimer, the term of this patent is extended or adjusted under 35 U.S.C. 154(b) by 1481 days.

This patent is subject to a terminal disclaimer.

(21) Appl. No.: 12/513,701

(22) PCT Filed: Dec. 28, 2004

(86) PCT No.: PCT/US2004/043779
§ 371 (c)(1),
(2), (4) Date: May 6, 2009

(87) PCT Pub. No.: WO2006/071225
PCT Pub. Date: Jul. 6, 2006

(65) Prior Publication Data
US 2011/0244340 A1  Oct. 6, 2011

Related U.S. Application Data

(63) Continuation-in-part of application No. 10/235,074, filed on Sep. 4, 2002, now Pat. No. 7,112,386.

(51) Int. Cl.
*H01M 4/86* (2006.01)
*H01M 4/92* (2006.01)
(Continued)

(52) U.S. Cl.
CPC *H01M 4/86* (2013.01); *H01M 4/92* (2013.01); *H01M 4/926* (2013.01); *H01M 4/96* (2013.01);
(Continued)

(58) Field of Classification Search
USPC ......... 429/523, 524, 525, 528, 529, 532, 483, 429/487, 485, 492
See application file for complete search history.

(56) References Cited

U.S. PATENT DOCUMENTS

| | | | |
|---|---|---|---|
| 4,438,216 | A | 3/1984 | Kampe et al. |
| 5,342,494 | A | 8/1994 | Shane et al. |

(Continued)

FOREIGN PATENT DOCUMENTS

| | | |
|---|---|---|
| AU | 1013703 A | 12/1965 |
| EP | 0 309 337 A1 | 3/1989 |

(Continued)

OTHER PUBLICATIONS

Japanese Office Action for JP2004-534309 dated Mar. 16, 2010.
(Continued)

*Primary Examiner* — Raymond Alejandro
(74) *Attorney, Agent, or Firm* — Seed IP Law Group PLLC (57) ABSTRACT

A membrane electrode assembly includes an anode including a hydrogen oxidation catalyst; a cathode; a membrane disposed between the anode and the cathode; and a peroxide decomposition catalyst positioned in at least one position selected from the group consisting of a layer between the anode and the membrane and a layer between the cathode and the membrane wherein the peroxide decomposition catalyst has selectivity when exposed to hydrogen peroxide toward reactions which form benign products from the hydrogen peroxide. The peroxide decomposition catalyst can also be positioned within the membrane. Also disclosed is a power-generating fuel cell system including such a membrane electrode assembly, and a process for operating such a fuel cell system. The assembly components contain ionomer material which can be perfluorinated or non-perfluorinated, high temperature, hydrocarbon, and the like.

22 Claims, 3 Drawing Sheets

(51) Int. Cl.
*H01M 4/96* (2006.01)
*H01M 8/10* (2006.01)
*H01M 8/24* (2006.01)

(52) U.S. Cl.
CPC ............ *H01M 8/103* (2013.01); *H01M 8/1004* (2013.01); *H01M 8/1023* (2013.01); *H01M 8/1025* (2013.01); *H01M 8/1027* (2013.01); *H01M 8/1032* (2013.01); *H01M 8/1039* (2013.01); *H01M 8/1048* (2013.01); *H01M 8/1058* (2013.01); *H01M 8/1072* (2013.01); *H01M 4/8605* (2013.01); *H01M 4/8657* (2013.01); *H01M 8/241* (2013.01); *H01M 2300/0082* (2013.01); *Y02E 60/521* (2013.01)

(56) References Cited

U.S. PATENT DOCUMENTS

| | | |
|---|---|---|
| 5,472,799 A | 12/1995 | Watanabe |
| 5,480,518 A | 1/1996 | Shane et al. |
| 5,523,181 A | 6/1996 | Stonehart et al. |
| 5,672,439 A | 9/1997 | Wilkinson et al. |
| 5,766,787 A | 6/1998 | Watanabe et al. |
| 5,795,669 A | 8/1998 | Wilkinson et al. |
| 5,800,938 A | 9/1998 | Watanabe |
| 5,874,182 A | 2/1999 | Wilkinson et al. |
| 5,981,097 A | 11/1999 | Rajendran |
| 6,024,848 A * | 2/2000 | Dufner et al. ............... 204/252 |
| 6,051,173 A | 4/2000 | Fasano et al. |
| 6,242,135 B1 | 6/2001 | Mushiake |
| 6,300,000 B1 | 10/2001 | Cavalca et al. |
| 6,309,769 B1 | 10/2001 | Haug |
| 6,335,112 B1 | 1/2002 | Asukabe et al. |
| 6,391,487 B1 * | 5/2002 | Totsuka ........................ 429/480 |
| 6,485,855 B1 | 11/2002 | Fukuda et al. |
| 6,607,856 B2 | 8/2003 | Suzuki et al. |
| 6,630,263 B1 | 10/2003 | McElroy |
| 7,112,386 B2 | 9/2006 | Cipollini et al. |
| 7,151,067 B2 | 12/2006 | Sakon et al. |
| 7,507,494 B2 | 3/2009 | Burlatsky et al. |
| 8,288,054 B2 | 10/2012 | Motupally et al. |
| 2002/0031696 A1* | 3/2002 | Kawahara et al. ............. 429/30 |
| 2002/0058172 A1 | 5/2002 | Datz et al. |
| 2002/0177032 A1 | 11/2002 | Suenaga et al. |
| 2003/0008196 A1* | 1/2003 | Wessel et al. .................. 429/40 |
| 2003/0059664 A1 | 3/2003 | Menjak et al. |
| 2004/0043283 A1 | 3/2004 | Cipollini et al. |
| 2004/0224216 A1 | 11/2004 | Burlatsky et al. |
| 2005/0064256 A1* | 3/2005 | Morse et al. .................... 429/19 |
| 2009/0162721 A1 | 6/2009 | Naohara et al. |
| 2009/0169951 A1 | 7/2009 | Suenaga et al. |

FOREIGN PATENT DOCUMENTS

| | | |
|---|---|---|
| EP | 1 298 751 A2 | 4/2003 |
| JP | 6-103992 | 4/1994 |
| JP | 6-226098 A | 8/1994 |
| JP | 7-90111 A | 4/1995 |
| JP | 2000-106203 A | 4/2000 |
| JP | 2000107773 | 4/2000 |
| JP | 2001-118591 A | 4/2001 |
| JP | 2001-155742 A | 6/2001 |
| JP | 2001-223015 A | 8/2001 |
| JP | 2002-198058 A | 7/2002 |
| JP | 2003-86188 A | 3/2003 |
| JP | 2003-12377 A | 4/2003 |
| JP | 2003-109602 A | 4/2003 |
| JP | 2005-538508 A | 12/2005 |
| WO | 2004023576 A2 | 3/2004 |
| WO | 2007050460 | 5/2007 |

OTHER PUBLICATIONS

European Search Report for EP 04815781.2, dated May 6, 2009.
Fuel-Cell Technology and Its Applications, First Edition, p. 97, TechnoSystem, 2000.
Visual Guide-All About Fuel Cells, First Edition, p. 101, Kogyo Chosakai Publishing Co., LTD., 2003.
Japanese Office Action for Application No. 2007-549333 dated Sep. 13, 2011.
U.S. Office action dated Oct. 25, 2013.
Restriction requirement issued Mar. 19, 2013 in corresponding U.S. Appl. No. 12/863,159.
International Preliminary Report on Patentability, dated Aug. 26, 2005, for International Application No. PCT/US04/43779, 11 pages.
International Search Report, mailed Mar. 29, 2005, for International Application No. PCT/US04/43779, 1 page.
Uchida et al., "Self-Humidifying Electrolyte Membranes for Fuel Cells—Preparation of Highly Dispersed $TiO_2$ Particles in Nafion 112," *Journal of the Electrochemical Society 150*(1):A57-A62, 2003.
Watanabe et al., "Direct Internally-Humidified Electrolyte Membranes for Polymer Electrolyte Fuel Cells. II. Properties of Nafion Membranes with Highly Dispersed Pt and $SiO_2$ or $TiO_2$," *ECS Extended Abstracts 94-2*, Abstract No. 506, Miami Beach, FL, Oct. 9-14, 1994, 2 pages.
Watanabe et al., "Self-Humidifying Polymer Electrolyte Membranes for Fuel Cells," *J. Electrochem. Soc. 143*(12):3847-3852, 1996.
Written Opinion, mailed Mar. 29, 2005, for International Application No. PCT/US04/43779, 5 pages.

* cited by examiner

MEMBRANE ELECTRODE ASSEMBLIES WITH HYDROGEN PEROXIDE DECOMPOSITION CATALYST

CROSS REFERENCE TO RELATED APPLICATION(S)

This application is a continuation-in-part of U.S. patent application Ser. No. 10/235,074, filed Sep. 4, 2002, now U.S. Pat. No. 7,112,386.

BACKGROUND OF THE INVENTION

The present invention relates to membrane electrode assemblies and, more particularly to such assemblies for fuel cells, especially for proton exchange membrane (PEM) fuel cells.

PEM fuel cells include a membrane electrode assembly (MEA) which typically includes an anode and cathode on either side of a membrane wherein fuel is fed to the anode, and oxygen to the cathode, and the resulting reaction generates electricity.

Unfortunately, current membrane technology produces stacks of cells including such membranes having useful lifetimes as short as about 1,000 hours which is well short of ultimate goals. When a membrane fails, failure occurs suddenly and ends the useful life of the cell, thereby necessitating immediate intervention. Cells can be excised from a stack for replacement, but will require great care and nevertheless will be accompanied by potential loss of adjacent cells. This type of replacement process is not a viable field service, and it is likely that once membrane failure begins, a stack replacement will be required.

It is clear that the need remains for membranes for fuel cell assemblies and the like which have longer useful lifetimes.

It is therefore the primary object of the present invention to provide a membrane electrode assembly having enhanced useful lifetime.

Other objects and advantages will appear hereinbelow.

SUMMARY OF THE INVENTION

In accordance with the present invention, the foregoing objects and advantages have been readily attained.

According to the invention, a membrane electrode assembly is provided which comprises an anode including a hydrogen oxidation catalyst; a cathode; a membrane disposed between said anode and said cathode; and a peroxide decomposition catalyst positioned in at least one position selected from the group consisting of a layer between said anode and said membrane, and a layer between said cathode and said membrane wherein said peroxide decomposition catalyst has selectivity when exposed to hydrogen peroxide toward reactions which form benign products from said hydrogen peroxide.

In accordance with a further embodiment of the present invention, a power-producing fuel cell system is provided which comprises an anode including a hydrogen oxidation catalyst; a cathode; a membrane disposed between said anode and said cathode; and a peroxide decomposition catalyst positioned in at least one position selected from the group consisting of said anode, said membrane, said cathode, a layer between said anode and said membrane and a layer between said cathode and said membrane, wherein said peroxide decomposition catalyst has selectivity when exposed to hydrogen peroxide toward reactions which form benign products from said hydrogen peroxide, and wherein said peroxide decomposition catalyst is selected from the group consisting of Pt, Pd, Ir, C, Ag, Au, Rh, Ru, Sn, Si, Ti, Zr, Al, Hf, Ta, Nb, Ce and combinations thereof.

In further accordance with the present invention, a process is provided for operating a fuel cell, which process comprises the steps of providing a fuel cell including a membrane electrode assembly comprising an anode including a hydrogen oxidation catalyst; a cathode; a membrane disposed between said anode and said cathode; and a peroxide decomposition catalyst positioned in at least one position selected from the group consisting of said anode, said membrane, said cathode a layer between said anode and said membrane and a layer between said cathode and said membrane, wherein said peroxide decomposition catalyst has selectivity when exposed to hydrogen peroxide toward reactions which form benign products from said hydrogen peroxide; and feeding a hydrogen-containing fuel to said anode and an oxygen source to said cathode so as to operate said fuel cell and generate hydrogen peroxide in the presence of said peroxide decomposition catalyst whereby said hydrogen peroxide is decomposed to said benign products.

BRIEF DESCRIPTION OF THE DRAWINGS

A detailed description of preferred embodiments of the present invention follows, with reference to the attached drawings, wherein.

DETAILED DESCRIPTION

The invention relates to a membrane electrode assembly and process for operating a PEM fuel cell containing same wherein the membrane is protected from attack by hydrogen peroxide decomposition products that can decompose or erode the cell membrane and reduce the life of the cell.

In accordance with the present invention, it has been found that the limitations on useful life of proton exchange membrane (PEM) fuel cells is often the useful life of the membrane. Over the lifetime of use of such membranes, it is found that the membranes are eroded until they fail. In accordance with the present invention, it has been found that this erosion is due to the harmful decomposition of hydrogen peroxide at or within the membrane, which generates radicals that decompose the membrane. In accordance with the present invention, such harmful products of decomposition of peroxides are avoided through incorporation of a peroxide decomposition catalyst in the membrane electrode assembly, and useful life of the membrane and cell containing same are extended.

Perfluorinated membranes can be desirable since they inherently have excellent chemical resistance to oxidative attack. However, the present invention is useful in protecting other types of membranes as well, such as membranes designed for high temperature applications and/or hydrocarbon membranes as well.

High temperature polymer electrolyte membranes are gaining increasing attention due to potential for improved heat rejection in automotive applications and improved waste heat recovery capability for stationary applications. At high temperature, however, the degradation reactions occur at a greater rate. The activation energy for chemical degradation from membranes is about 20 kcal/mol. In general, the following represents this relation:

$$\frac{r}{r^0} = A\exp(-Ea/RT),$$

wherein
$r/r^0$ is the relative reaction rate or rate constant,
A is the pre-exponential or frequency factor,
Ea is activation energy,
R is universal gas constant, and
T is absolute temperature.

As made clear from consideration of the above relationship, an exponential increase in degradation rate is expected with increasing temperature. Consequently, polymer electrolyte membranes such as composites of Nafion and inorganic oxides, etc., when operated under high temperature, will exhibit higher degradation rates. In automotive applications, non-perfluorinated membranes are increasingly of interest primarily for cost reasons. Such membranes, however, are less resistive to oxidative attack than perfluorinated membranes. The more non-fluorinated sites within a membrane, the more susceptible the membrane is to attack. Thus, a hydrocarbon membrane such as a polystyrene sulphonic acid membrane would be substantially vulnerable to oxidative attack.

The present invention can advantageously protect all of the above-identified membranes or materials, perfluorinated and non-perfluorinated, high temperature, hydrocarbon and the like, and is particularly well suited to use with these types of membranes.

Figure 1:
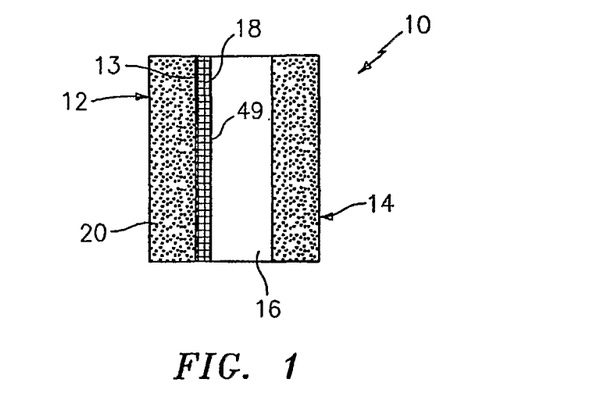
FIG. 1 illustrates a two-layer anode configuration of a membrane electrode assembly in accordance with the present invention.

FIG. 1 illustrates a portion of a fuel cell including a membrane electrode assembly (MEA) 10 in accordance with the present invention. MEA 10 includes an anode catalyst layer 12, a cathode catalyst layer 14 and a membrane 16 positioned therebetween. As will be discussed below, a peroxide decomposition catalyst layer or underlayer 18 is positioned in this embodiment between membrane 16 and anode catalyst layer 12. The anode and cathode catalyst layers are referred to herein as anodes and cathodes respectively for simplicity. It should be appreciated that the actual anode or cathode is positioned outwardly of layers 12, 14, for example as is shown and described more completely in FIG. 4 as more completely described below. In normal operation of a fuel cell, a hydrogen-containing fuel is fed to anode 12, and an oxygen source is fed to cathode 14, and reactions occur which generate a potential across membrane 16 as desired.

Each of anode electrode catalyst 12, peroxide decomposition layer 18, membrane 16, peroxide decomposition layer 16 and cathode electrode catalyst 14 contains some ionomer material or ionic polymers capable of proton conduction, and this material can be perfluorinated, partially fluorinated and/or non-fluorinated. Each layer may contain the same ionomer material, or different ionomer materials in some layers can be employed. This is true as to the embodiments shown in FIGS. 2-6 as well.

Non-limiting examples of suitable perfluorinated materials include: DuPont and Solvay Solexis' Dow®, and Asahi Chemical's Aciplex of various equivalent weights (~600 to 1500); and ionomers combined with heteropolycompounds with and without thiophene such as Nafion®-silicotungstic acid (NASTA), or Nafion®-phosphotungstic acid or Nafion®-phosphozirconic acid.

Non-limiting examples of suitable partially fluorinated materials include: crosslinked and non-crosslinked poly-α,β, β,-trifluorostyrene; radiation grafted polymers, polystyrene grafted onto PTFE, FEP, PVDF, and the like; such as Permion® and Raymion®; and sulfonated bis phenol polysulfones.

Non-limiting examples of suitable non-fluorinated materials include: poly styrene sulfonic acid and poly styrene sulfonic acid crosslinked with divinyl benzene; modified liquid-crystal aromatic polyesters; polybenzimidazoles imbibed with phosphoric acid; sulfonated polyimides; sulfonated polyphenylene sulfides; sulfonated poly sulfones; sulfonated poly(arylethersulfones); and sulfonated poly ketones, and poly (ether ether ketones).

Ionomer materials for these various locations can be reinforced. One non-limiting example is reinforced perfluorinated membranes provided with reinforcements of either macro-reinforcement accomplished by combining a woven fabric media with an ion exchange material and micro-reinforcement as accomplished by combining non-ionically functional microporous media with ion exchange materials In accordance with the present invention, it has also been found that hydrogen peroxide is frequently created at an interface 49 (also shown in FIG. 4) between the peroxide decomposition layer 18 and membrane 16 by partial reduction of crossover oxygen. At the anode potential, the surface of typical hydrogen oxidation catalyst positioned in the anode under layer 18 is such that oxygen which comes into contact with the catalyst in this position has a high chance of being reduced to hydrogen peroxide. Oxygen can come into contact with the anode catalyst through oxygen crossover or through an air-bleed intended to mitigate CO-poisoning, or through other mechanisms.

Hydrogen peroxide can decompose to benign products, for example water and oxygen. Under certain conditions, however, hydrogen peroxide decomposes to products which can damage the membrane. For example, hydrogen peroxide can react with an impurity ion or high surface area particulate to generate a .OH radical, which can attack the polymer of the membrane. It is believed in accordance with the present invention that such radicals are formed when hydrogen peroxide reaches the membrane, and that such radicals are responsible for chemical erosion or consumption of the membrane.

In accordance with the present invention, a peroxide decomposition catalyst is incorporated into membrane electrode assembly 10 (FIG. 1) and is advantageously positioned to cause benign decomposition of hydrogen peroxide, preferably into water and oxygen. In accordance with the invention, the peroxide decomposition catalyst can be positioned in one or more locations including within the anode, within the cathode, within the membrane itself, as an essentially non-porous (porosity <5%) layer between the anode and the membrane, as an essentially non-porous layer between the cathode and the membrane and in combinations of these locations. Preferred locations are in layer(s) between membrane 16 and one or both of anode 12 and catalyst 14.

The peroxide decomposition catalyst in accordance with the present invention is preferably one selected to have activity toward benign decomposition of hydrogen peroxide and/or consumption of potential peroxide forming reactants such as, but not limited to, crossover hydrogen and/or oxygen. Benign decomposition is considered to be that which leads to products that are not harmful to the structure of the membrane. Thus, benign decomposition includes that which decomposes hydrogen peroxide to form water and oxygen. Specific decomposition which is not considered benign, and which is prevented by the catalyst incorporation of the present invention, is decomposition of hydrogen peroxide to form radicals such as .OH and .OOH.

Peroxide decomposition catalysts in accordance with the present invention are preferably those which do not allow escape or generation of free radicals from hydrogen peroxide.

In accordance with the present invention, the peroxide decomposition catalyst can include conducting and non-conducting materials, preferably those which are electrochemically stable within a fuel cell environment. Preferably, the peroxide decomposition catalyst is an element or composition containing an element selected from the group consisting of Pt, Pd, Ir, C, Ag, Au, Rh, Ru, Sn, Si, Ti, Zr, Al, Hf, Ta, Nb, Ce and combinations thereof, preferably Pt, Pd, Ir, C, Ag, Au, Rh, Ru and combinations thereof. Such catalysts are further preferably provided on a support which may advantageously be selected from the group consisting of oxides of Ru, Sn, Si, Ti, Zr, Al, Hf, Ta, Nb and Ce, as well as zeolites, carbon and mixtures thereof.

As used herein, a catalyst is considered to be within an electrode or the membrane when it is incorporated as a layer into the electrode or membrane, or is dispersed through the electrode or membrane, or both.

In accordance with one aspect of the present invention, peroxide decomposition catalyst is preferably positioned adjacent to the anode and/or cathode of a membrane electrode assembly so as to provide for benign decomposition of hydrogen peroxide. As used herein, the term "adjacent" includes physically adjacent positioning to, as well as positioning in electric communication with, the electrode.

In the embodiment illustrated in FIG. 1, peroxide decomposition catalyst is provided as a non-porous layer 18 positioned on a membrane-facing side or surface 13 of anode 12.

Layer 18 can advantageously be an electrically connected and ionically conductive structure having a porosity of between about 0% and about 30%, wherein the peroxide decomposition catalyst is present in an amount between about 5% and about 50% based upon volume of the layer, and wherein ion-exchange material is present in an amount between about 5% and about 95% based upon volume of the layer.

Still referring to FIG. 1, in this embodiment, anode 12 of the membrane electrode assembly includes a hydrogen oxidation catalyst, and underlying layer or under layer 18 contains the peroxide decomposition catalyst in accordance with the present invention. In this embodiment, layer 18 is adjacent to surface 13 of anode 12.

The hydrogen oxidation catalyst in anode 12 can be any catalyst having suitable activity or selectivity toward the desired reactions. Examples of suitable hydrogen oxidation catalyst include platinum and platinum-ruthenium catalyst, and this catalyst can preferably be supported on a suitable support such as carbon.

Other catalyst(s) can be incorporated into layer 18, along with the peroxide decomposition catalyst, so long as sufficient selectivity is provided in layer 18 to provide a desired level of benign destruction of hydrogen peroxide.

It may also be preferable that layer 18 be provided having a high ionomer content, preferably sufficiently high that this layer is substantially non-porous, having a porosity of less than about 20%. Layer 18 is further preferably relatively thin, and is provided having a low volume fraction of catalyst so as to minimize ionic resistance due to the added layer.

Layers 18 in one embodiment is preferably provided in electrical continuity with anode 12, and such electrical continuity can greatly simplify manufacturing relative to an electrically insulated layer. Further, it is preferred to place layer 18 as close to anode 12 as possible since this interface between layer 18 and membrane 16 is where hydrogen peroxide is expected to form and aggressively attack the membrane.

In accordance with the embodiment of FIG. 1, when membrane electrode assembly 10 is in operation, any hydrogen peroxide generated in anode 12, or at surface 13 or between anode 12 and layer 18, is in near proximity to peroxide decomposition catalyst in layer 18, and is broken down via benign pathways before entering membrane 16 as desired. This advantageously serves to extend the useful lifetime of membrane 16 within assembly 10, thereby enhancing product life as desired in accordance with the present invention.

Figure 2:
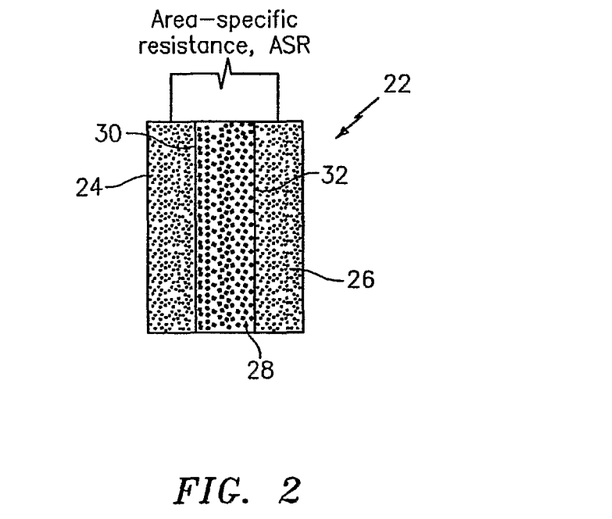
FIG. 2 illustrates a membrane electrode assembly in accordance with the present invention wherein the membrane also contains catalyst.

Turning now to FIG. 2, an alternative embodiment of a membrane electrode assembly 22 is illustrated. FIG. 2 shows membrane electrode assembly 22 having anode 24, cathode 26 and a catalyzed membrane 28 which contains the desired peroxide decomposition catalyst dispersed therethrough. This catalyst, in similar fashion to the layer embodiment of FIG. 1, advantageously serves to decompose hydrogen peroxide via benign pathways when the peroxide enters membrane 28.

In accordance with the embodiment of FIG. 2, it should be appreciated that catalyst disposed therethrough may or may not be electrically insulating. An insulating or non-conductive layer may result from properties of the particles of catalyst and/or the support, or may result in a conducting layer having a range of area-specific electronic resistance of between about 200 and about 2000 Ohm-cm$^2$. Such a range gives rise to a negligible parasitic current, on the order of 0.5-5 mA/cm$^2$. This configuration of catalyst serves to greatly simplify manufacturing and does not meaningfully impact upon cell performance.

In further accordance with the embodiment of FIG. 2, and as shown, in this embodiment the membrane is also catalyzed throughout the entire membrane, including and up to a surface 30 facing anode 24 and a surface 32 facing cathode 26. This can be accomplished, for example, by dispersing catalyst through membrane 28 as illustrated. This advantageously provides membrane 28 with protection from hydrogen peroxide generated at either anode 24 or cathode 26.

In the embodiment of FIG. 2, since a weak electronic connection between anode 24 and cathode 26 is tolerated, loading of catalyst in the membrane is less restricted than it would be if the catalyzed membrane were to be electrically isolated.

In accordance with a further embodiment of the invention (See FIG. 3), a membrane electrode assembly 34 is provided having an anode 36, a cathode 38 and a membrane 40 positioned therebetween. In this embodiment, in addition to the hydrogen oxidation catalyst positioned in anode 36 and the oxygen reduction catalyst which may be present in cathode 38, peroxide decomposition catalyst is advantageously dispersed through anode 36 and cathode 38 as well. Mixing of catalyst in the electrodes in accordance with this embodiment of the present invention can advantageously allow for positioning of peroxide decomposition catalyst as close as possible to its source, that is, the hydrogen oxidation and/or oxygen reduction catalyst.

Figure 3:
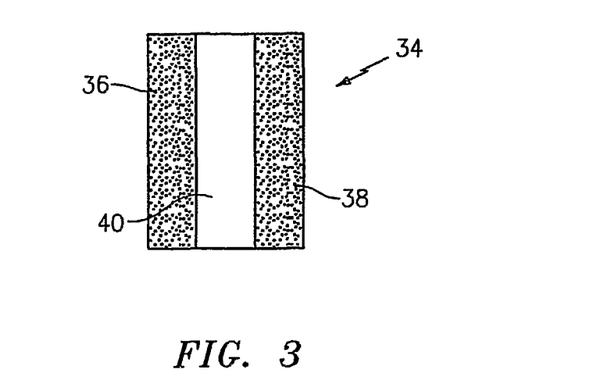
FIG. 3 illustrates a further embodiment of the present invention wherein catalyst is also dispersed through the anode and cathode.

Of course, it should also be appreciated that the peroxide decomposition catalyst location as illustrated in each of FIGS. 1, 2 and 3 can be combined in other manners. Further, in connection with the embodiment of FIG. 1, peroxide decomposition catalyst can additionally be positioned in a layer between membrane 16 and cathode 14, if desired and/or necessary, as shown in FIG. 4.

Figure 4:
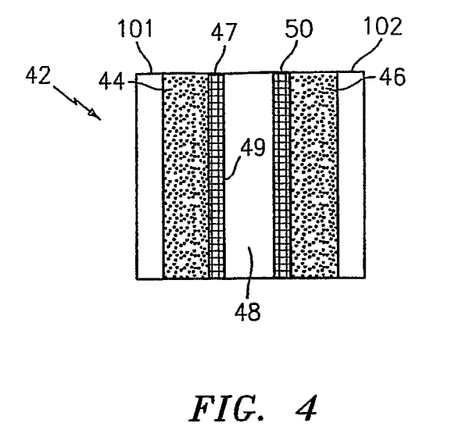
FIG. 4 illustrates an embodiment of the present invention wherein catalyst is provided in layers between the membrane and anode and between the membrane and cathode.

FIG. 4 illustrates a further membrane electrode assembly 42 in accordance with the present invention including anode catalyst layer 44, cathode catalyst layer 46 (referred to herein as anode 44 and cathode 46) and membrane 48 disposed therebetween. FIG. 4 also shows gas diffusion layers 100, 102 which are electrically connected to the actual electrodes. These layers are positioned on either side of the membrane assembly including membrane, anode catalyst layer 44 and cathode catalyst layer 46. In this embodiment, anode 44 includes hydrogen oxidation catalyst disposed therein, and cathode 46 includes oxygen reduction catalyst disposed therein, as is well known to a person of ordinary skill in the art. Further, in this embodiment, anode 44 is adjacent to a layer 47 containing peroxide decomposition catalyst in accordance with the present invention, and adjacent to cathode 46 is a layer 50 of peroxide decomposition catalyst in accordance with the present invention. These layers 47, 50 are essentially non-porous and electrically connected to the anode and cathode catalyst layers 44 and 46. As described above, this embodiment advantageously serves to provide for benign decomposition of peroxide generated through either electrode of assembly 42 as desired in accordance with the present invention, and serves to enhance the useful lifetime of membrane 48.

Figure 5:
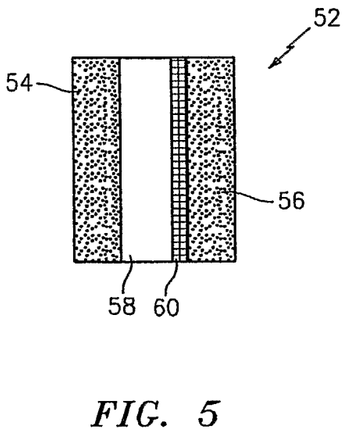
FIG. 5 illustrates a further embodiment of the present invention wherein catalyst is provided only in a layer between the cathode and membrane.

Turning now to FIG. 5, a further membrane electrode assembly 52 in accordance with the present invention is illustrated, which includes anode 54, cathode 56 and membrane 58 disposed therebetween. In this embodiment, a layer 60 of peroxide decomposition catalyst is added between cathode 56 and membrane 58. This configuration may be desired when membrane electrode assembly 52 is to be operated in such a fashion that peroxide is expected to be generated within cathode 56.

Figure 6:
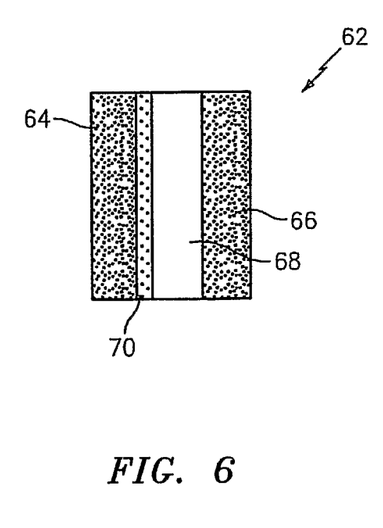
FIG. 6 illustrates an embodiment of the present invention wherein peroxide decomposition catalyst is provided in a dispersed layer between the membrane and anode.

Turning now to FIG. 6, still another embodiment of the present invention is illustrated. In this embodiment, peroxide decomposition catalyst is disposed in a separate layer, 70, by being dispersed through that layer. Thus, FIG. 6 shows a membrane electrode assembly 62 in accordance with the present invention including anode 64, cathode 66 and membrane 68 positioned therebetween. In this embodiment, a separate layer 70 is provided in the form of suitable peroxide decomposition catalyst dispersed through suitable layer material. For example, such a layer of catalyst can be disposed within the membrane by impregnation into the membrane material to a desired depth from either or both sides or surfaces of the membrane. In this embodiment, wherein electrical conductivity is not required, the catalyst density can advantageously be lower than in other configurations. Otherwise, this layer, like others previously described, is essentially non-porous, like membrane 58. It should of course be appreciated that FIG. 6 shows a configuration with a layer containing dispersed catalyst between the anode and membrane of the assembly. Such a dispersed catalyst layer can likewise be positioned between the cathode and the membrane if desired, either alone or in combination with the layer as illustrated in FIG. 6.

In order to provide maximum protection or shielding of the membrane from hydrogen peroxide, the intermixed anode and cathode of FIG. 3, containing peroxide decomposition catalyst, can be combined with the electrode-peroxide decomposition catalyst layer composites of FIG. 1, for either the anode or the cathode or both (as in FIG. 4), so as to decompose all potential sources of peroxide entering the membrane.

In further accordance with the present invention, it has also been found, advantageously, that the use of peroxide decomposition catalysts which are supported on oxides can be exploited to alter the water transfer characteristics of the anode and cathode, for example to make the anode more hydrophilic than the cathode.

In accordance with a further aspect of the present invention, the membrane electrode assembly can advantageously be provided with peroxide decomposition catalysts in the anode, membrane, cathode, layers between the anode and membrane, and/or layers between the cathode and the membrane, and when peroxide decomposition catalyst is so positioned, a particularly preferred group of peroxide decomposition catalysts includes elements or compositions containing elements selected from the group consisting of Pt, Pd, Ir, C, Ag, Au, Rh, Ru, Sn, Si, Ti, Zr, Al, Hf, Ta, Nb, Ce and combinations thereof. This catalyst may further be supported on support as identified above.

Also as set forth above, the membrane electrode assembly described herein is particularly advantageous when utilized in a power-producing fuel cell system. In such a configuration, the electrode assembly is positioned in a stack of similar components, and the stack is fed with fuel that is preferably rich in hydrogen, as well as an oxidant or oxygen source. In addition to the well known reactions to generate power, this feeding of components to the fuel cell will also form hydrogen peroxide which, in accordance with the invention, is to be decomposed along benign pathways. In accordance with the present invention, the peroxide decomposition catalyst advantageously serves to decompose this hydrogen peroxide along benign pathways, preferably to generate water and oxygen, so that the membrane of the membrane electrode assembly is protected from attack by radicals or other harmful peroxide decomposition products, and membrane life is extended.

The assembly consisting of electrodes and peroxide decomposition catalyst layers, of the present invention is referred to herein as a membrane electrode assembly. It should of course be appreciated that this term is intended to specifically include unitized electrode assemblies (UEA) shown in FIG. 4, as well, which consists of an MEA outfitted with gas diffusion layers 100, 102 and a seal (not shown).

Figure 7:
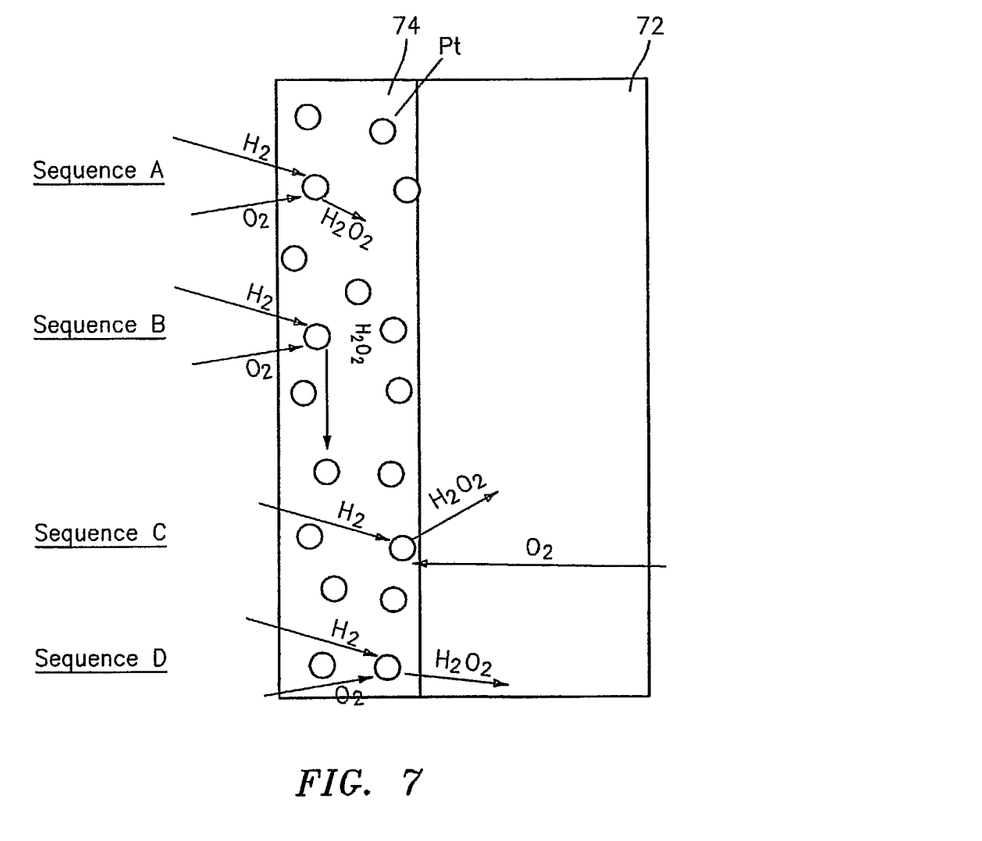
FIG. 7 schematically illustrates different reactions which occur during operation of a fuel cell containing a membrane electrode assembly in accordance with the present invention.

FIG. 7 illustrates various reactions which occur and which can lead to problematic formation of hydrogen peroxide. FIG. 7 shows a portion of a membrane electrode assembly including a membrane 72, and an electrode 74 containing platinum particles as hydrogen oxidation catalyst. FIG. 7 further shows various incoming anode hydrogen and bleed oxygen which in the presence of the platinum particles can generate hydrogen peroxide ($H_2O_2$). The reaction illustrated in sequence A could lead to attack of the electrode material. However, in practice, most if not all of such reactions are overcome by the reactions which take place as illustrated in sequence B of FIG. 7, wherein hydrogen peroxide is decomposed within the electrode. However, sequences C and D of FIG. 7 lead to generation of hydrogen peroxide in close proximity to membrane 72, and this leads to the undesirable probability of harmful decomposition of peroxide which is overcome in accordance with the present invention. In these two sequences, when hydrogen meets a platinum particle in close proximity to the membrane and oxygen, either coming from crossover oxygen as in sequence C or in the form of bleed oxygen as shown in sequence D, hydrogen peroxide is formed and can penetrate membrane 72, where decomposition into harmful products results in chemical degradation or consumption of membrane 72.

Benign decomposition of hydrogen peroxide, which is promoted in accordance with the present invention, generally happens within the MEA, and occurs in accordance with the following reactions:

$$H_2O_2 + H_2 \rightarrow 2H_2O \text{ (low potential)}$$

$$H_2O_2 \rightarrow \tfrac{1}{2} + H_2O \text{ (high potential)}$$

These benign reactions typically occur when hydrogen peroxide decomposes at low and high potentials, respectively, in the presence of platinum. In accordance with the present invention, it has been found that once hydrogen peroxide enters the membrane, in the presence of a species X, which may be an impurity ion or high surface area particulate, the following reaction occurs instead:

$$H_2O_2 + X \rightarrow \cdot OH$$

The .OH radical can attack the polymer, or can recombine into hydrogen peroxide, and can further react with hydrogen peroxide to generate other radicals such as .OOH. It is believed that the radicals then attack the membrane, causing consumption or degradation of same.

Positioning of peroxide decomposition catalysts as set forth in the present invention serves to produce the benign decomposition of such hydrogen peroxide into oxygen and water as desired above, and to avoid decomposition of hydrogen peroxide in the presence of any species or impurities of the membrane which lead to radical formation and damage to the membrane.

It should be appreciated that the present invention provides for membrane protection from peroxide decomposition products that can attack the membrane, thus reducing erosion of the membrane and increasing the useful life of the membrane as desired. This protection is applicable to perfluorinated membranes, non-perfluorinated membranes and hydrocarbon membranes as well as any other type of membrane which would be susceptible to attack from decomposition products of hydrogen peroxide.

In the preferred embodiments discussed above in connection with FIGS. 1 and 4-6, a layer or underlayer is positioned between the membrane and one or both electrodes. These underlayers have also been referred to in related filings as an extended catalyzed layer. This layer is distinguishable from the electrode to which it is generally adjacent in several respects.

One important distinction is porosity. The electrode catalyst layers (12, 14, in FIG. 1) typically have a porosity of greater than about 30%, generally greater than about 35% and typically up to about 60%. In contrast, the layer or underlayer (18 in FIG. 1) preferably has a porosity which is less than that of the electrode catalyst layers, preferably less than about 20%, and more preferably the layer or underlayer is essentially non-porous (porosity <5%).

The electrode catalyst layers also have less ionomer content by volume and by weight than the underlayer.

Electrical connectivity between catalyst particles is another area where the electrode catalyst layer has a greater value, as compared to the underlayers.

In connection with ionic contact of membrane electrolyte to catalyst particles, the electrode catalyst layer is generally lower in value than the underlayer.

Finally, while the electrode catalyst layer is preferably hydrophobic, the underlayer is preferably as hydrophilic as possible so as to retain water to hydrate the ionomer and depress gas diffusion.

Membrane electrode assemblies with peroxide decomposition catalyst are also described in co-pending and commonly owned U.S. patent application Ser. No. 10/795,181, filed Mar. 4, 2004 which is incorporated herein by reference.

It is to be understood that the invention is not limited to the illustrations described and shown herein, which are deemed to be merely illustrative of the best modes of carrying out the invention, and which are susceptible of modification of form, size, and arrangement of parts and details of operation. The invention rather is intended to encompass all such modifications which are within its spirit and scope as defined by the claims.

What is claimed:

1. A membrane electrode assembly, comprising:
    an anode including a first hydrogen oxidation catalyst;
    a cathode;
    a membrane disposed between said anode and said cathode; and
    a peroxide decomposition catalyst positioned in a first porous layer between said anode and said membrane and in a second porous layer between said cathode and said membrane, wherein said peroxide decomposition catalyst has selectivity when exposed to hydrogen peroxide toward reactions which form benign products from said hydrogen peroxide, and wherein said first and second porous layers each have a porosity of greater than 0% and less than or equal to about 20%, wherein the porosity of the first and second porous layers is less than that of the anode and the cathode, and wherein at least one of said anode, cathode, membrane, first porous layer, and second porous layer includes perfluorinated polymer electrolyte ionomer material, wherein the first porous layer is separate from the anode, the first hydrogen oxidation catalyst and the peroxide decomposition catalyst comprise different elements, the peroxide decomposition catalyst constitutes between about 5% and about 50% of the first porous layer by volume, and the anode includes a hydrophobic porous anode catalyst layer including the first hydrogen oxidation catalyst and the first porous layer is hydrophilic.

2. The assembly of claim 1, wherein the membrane is a reinforced membrane selected from the group consisting of macro-reinforced membranes comprising an ion exchange material combined with a woven fabric media and micro-reinforced membranes comprising ion exchange material combined with non-ionically functional microporous media.

3. The assembly of claim 1, wherein said peroxide decomposition catalyst comprises an element selected from the group consisting of Pt, Pd, Ir, C, Ag, Au, Rh, Ru, Sn, Si, Ti, Zr, Al, Hf, Ta, Nb, Ce and combinations thereof.

4. The assembly of claim 3, wherein said peroxide decomposition catalyst comprises an element selected from the group consisting of Pt, Pd, Ir, C, Ag, Au, Rh, Ru and combinations thereof.

5. The assembly of claim 3, wherein said peroxide decomposition catalyst is supported on a support selected from the group consisting of oxides of Ru, Sn, Si, Ti, Zr, Al, Hf, Ta, Nb and Ce, zeolites, carbon and combinations thereof.

6. The assembly of claim 1, wherein said peroxide decomposition catalyst comprises an element selected from the group consisting of Ag, Au, C and combinations thereof.

7. The assembly of claim 6, wherein said peroxide decomposition catalyst is supported on carbon.

8. The assembly of claim 1, wherein said peroxide decomposition catalyst is carbon.

9. The assembly of claim 1, wherein said first porous layer is electrically connected to said anode.

10. The assembly of claim 1, wherein said first porous layer further comprises a second hydrogen oxidation catalyst.

11. The membrane electrode assembly of claim 1, wherein:
the first hydrogen oxidation catalyst comprises platinum; and
the peroxide decomposition catalyst comprises an element selected from the group consisting of Pd, Ir, C, Ag, Au, Rh, Sn, Si, Ti, Zr, Al, Hf, Ta, Nb, Ce.

12. The membrane electrode assembly of claim 1, wherein:
the first hydrogen oxidation catalyst consists of platinum; and
the peroxide decomposition catalyst consists of an element selected from the group consisting of Pd, Ir, C, Ag, Au, Rh, Sn, Si, Ti, Zr, Al, Hf, Ta, Nb, Ce.

13. A membrane electrode assembly, comprising:
an anode including a first hydrogen oxidation catalyst;
a cathode;
a membrane positioned between the anode and the cathode; and
a peroxide decomposition catalyst positioned in a porous layer between the anode and the membrane, wherein the peroxide decomposition catalyst has selectivity when exposed to hydrogen peroxide toward reactions which form benign products from the hydrogen peroxide, and wherein the porous layer has a porosity of greater than 0% and less than or equal to about 20%, wherein the porosity of the porous layer is less than that of the anode and the cathode, and wherein at least one of the anode, cathode, membrane, and porous layer includes perfluorinated polymer electrolyte ionomer material, wherein the porous layer is separate from the anode, the first hydrogen oxidation catalyst and the peroxide decomposition catalyst comprise different elements, the peroxide decomposition catalyst constitutes between about 5% and about 50% of the porous layer by volume, and the anode includes a hydrophobic porous anode catalyst layer including the first hydrogen oxidation catalyst and the porous layer is hydrophilic.

14. The membrane electrode assembly of claim 13, wherein the porous layer includes a woven fabric media.

15. The membrane electrode assembly of claim 13, wherein the porous layer has a porosity of between about 0% and about 5%.

16. A membrane electrode assembly, comprising:
an anode including a first hydrogen oxidation catalyst;
a cathode;
a membrane disposed between the anode and the cathode; and
a peroxide decomposition catalyst positioned in a porous layer between the cathode and the membrane, the peroxide decomposition catalyst has selectivity when exposed to hydrogen peroxide toward reactions which form benign products from the hydrogen peroxide, and the porous layer has a porosity of greater than 0% and less than or equal to about 20%, the porosity of the porous layer is less than that of the anode and the cathode, and at least one of the anode, cathode, membrane, and porous layer includes perfluorinated polymer electrolyte ionomer material, wherein the porous layer is separate from the cathode, the first hydrogen oxidation catalyst and the peroxide decomposition catalyst comprise different elements, the peroxide decomposition catalyst constitutes between about 5% and about 50% of the porous layer by volume, and the anode includes a hydrophobic porous anode catalyst layer including the first hydrogen oxidation catalyst and the porous layer is hydrophilic.

17. The membrane electrode assembly of claim 16, wherein the porous layer includes a woven fabric media.

18. The membrane electrode assembly of claim 16, wherein the porous layer has a porosity of between about 0% and about 5%.

19. A device, comprising:
a membrane electrode assembly that includes:
a membrane including a perfluorinated polymer electrolyte ionomer material;
a porous anode catalyst layer including a hydrogen oxidation catalyst; and
a porous peroxide decomposition layer including a peroxide decomposition catalyst, the peroxide decomposition catalyst being configured to catalyze reactions to have benign decomposition of hydrogen peroxide, the porous peroxide decomposition layer having a porosity of greater than 0% and less than about 20%, and the porosity of the porous peroxide decomposition layer being less than a porosity of the porous anode catalyst layer, wherein the porous peroxide decomposition layer is separate from the porous anode catalyst layer, the hydrogen oxidation catalyst and the peroxide decomposition catalyst comprise different elements, the peroxide decomposition catalyst constitutes between about 5% and about 50% of the porous peroxide decomposition layer by volume, and the porous anode catalyst layer is hydrophobic and the porous peroxide decomposition layer is hydrophilic.

20. The device of claim 19, wherein the porous anode catalyst layer has a lower ionomer content, by volume and by weight, than the porous peroxide decomposition layer.

21. The device of claim 19, wherein the porous peroxide decomposition layer includes a woven fabric media.

22. The device of claim 19, wherein the porosity of the porous peroxide decomposition layer is between about 0% and about 5%.

* * * * *

UNITED STATES PATENT AND TRADEMARK OFFICE
CERTIFICATE OF CORRECTION

PATENT NO. : 9,118,081 B2  
APPLICATION NO. : 12/513701  
DATED : August 25, 2015  
INVENTOR(S) : Ned E. Cipollini et al.

Page 1 of 1

It is certified that error appears in the above-identified patent and that said Letters Patent is hereby corrected as shown below:

ON THE TITLE PAGE

Item (56):
"JP 2003-12377 A 4/2003," should read, --JP 2003-123777 A 4/2003--.

Signed and Sealed this
Fifteenth Day of March, 2016

Michelle K. Lee
*Director of the United States Patent and Trademark Office*